(12) United States Patent
Kikuchi et al.

(10) Patent No.: US 7,583,036 B2
(45) Date of Patent: Sep. 1, 2009

(54) ELECTRICALLY DRIVEN VEHICLE

(75) Inventors: Akira Kikuchi, Hitachi (JP); Takashi Ikimi, Hitachi (JP); Keizo Shimada, Hitachi (JP); Naoshi Sugawara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 126 days.

(21) Appl. No.: 11/764,828

(22) Filed: Jun. 19, 2007

(65) Prior Publication Data

US 2008/0001558 A1    Jan. 3, 2008

(30) Foreign Application Priority Data

Jun. 28, 2006    (JP) .............. 2006-177491

(51) Int. Cl.
*H02P 5/00* (2006.01)

(52) U.S. Cl. .............. 318/5; 318/8; 318/162; 318/163; 318/139; 180/65.1; 180/65.5

(58) Field of Classification Search .............. 318/5, 318/8, 162, 163, 139; 180/65.1, 65.5, 282
See application file for complete search history.

(56) References Cited

U.S. PATENT DOCUMENTS

| | | | |
|---|---|---|---|
| 5,289,890 A * | 3/1994 | Toyoda et al. .............. 180/65.8 |
| 5,343,971 A | 9/1994 | Heidelberg et al. | |
| 5,345,155 A * | 9/1994 | Masaki et al. .......... 318/400.07 |
| 5,453,930 A * | 9/1995 | Imaseki et al. .............. 701/22 |
| 5,481,460 A * | 1/1996 | Masaki et al. .............. 701/50 |
| 5,939,846 A | 8/1999 | Young et al. | |
| 5,973,463 A * | 10/1999 | Okuda et al. .............. 318/430 |
| 6,425,643 B2 * | 7/2002 | Shirai et al. .............. 303/112 |
| 6,988,570 B2 * | 1/2006 | Takeuchi .............. 180/6.48 |
| 2009/0093931 A1 * | 4/2009 | Mizutani et al. .............. 701/42 |

FOREIGN PATENT DOCUMENTS

| | | |
|---|---|---|
| DE | 40 11 291 A1 | 10/1991 |
| JP | 2006-166684 | 6/2006 |
| JP | 2006-230084 | 8/2006 |
| JP | 2007-259611 | 10/2007 |

* cited by examiner

*Primary Examiner*—Bentsu Ro
*Assistant Examiner*—Thai Dinh
(74) *Attorney, Agent, or Firm*—Antonelli, Terry, Stout & Kraus, LLP.

(57) ABSTRACT

In an electrically driven vehicle having a controller, the vehicle has a steering angle sensor for outputting a detected value of a steering angle of the vehicle, the controller includes a first torque order pattern along which a torque order for a first electric motor is determined and a second torque order pattern along which a torque order for a second electric motor is determined, and the first and second torque order pattern are modified on the basis of the detected value of the steering angle so that the torque order determined along the second torque order pattern is greater than the torque order determined along the first torque order pattern under the identical velocity when the vehicle turns to the left, and the torque order determined along the first torque order pattern is greater than the torque order determined along the second torque order pattern under the identical velocity when the vehicle turns to the right.

12 Claims, 15 Drawing Sheets

FIG. 16
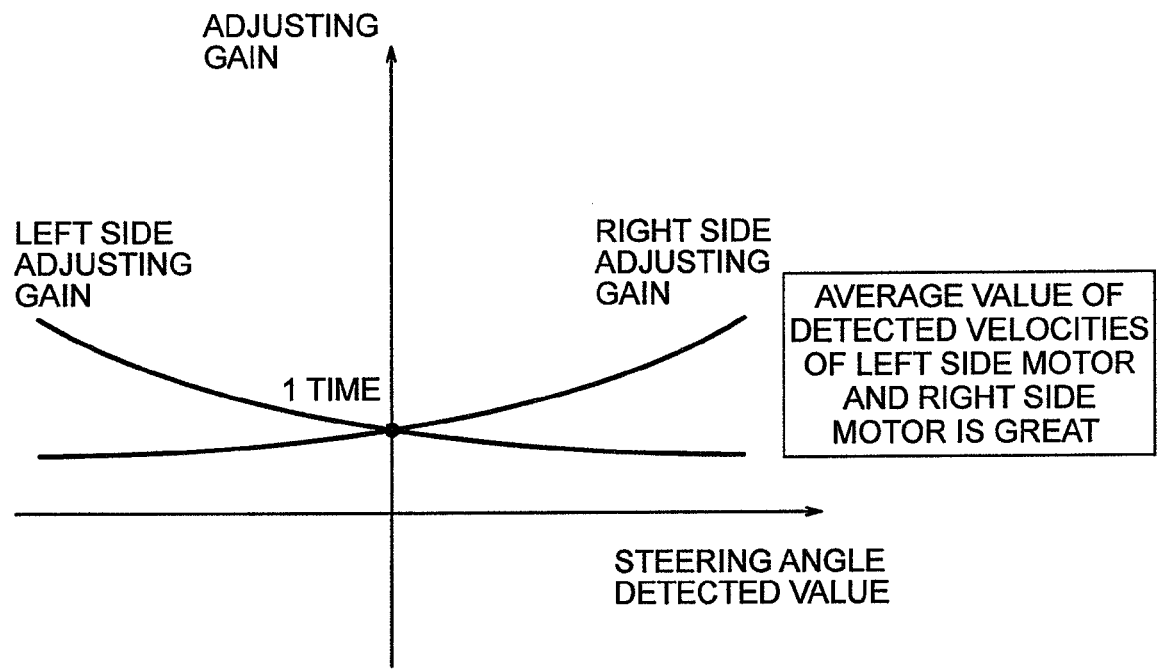
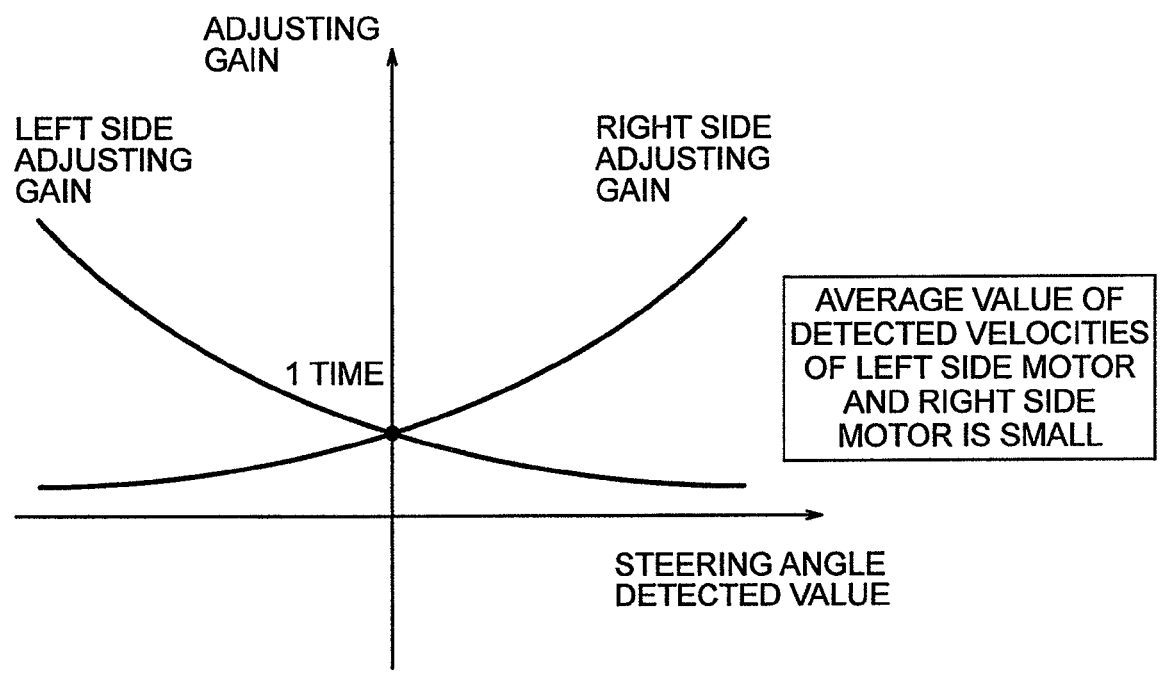

ELECTRICALLY DRIVEN VEHICLE

BACKGROUND OF THE INVENTION

The present invention relates to an electrically driven vehicle having electric motors independent of each other for respective left and right sides.

A prior art system for controlling a torque ordering distribution in an electrically driven vehicle in which electric motors independent of each other drive left and right wheels respectively will be explained. Generally, the torques ordered for the respective electric motors driving respectively the left and right wheels independently of each other are made in proportion to velocities of the respective wheels. Since the velocity of the wheel at a radially outer side on a turn is greater than the velocity of the wheel at a radially inner side thereon, the torque ordered for the electric motor for driving the wheel at the radially outer side is greater than the torque ordered for the electric motor for driving the wheel at the radially inner side to improve a turning performance. For example, a vehicle in which such torque ordering distribution is carried out is disclosed by U.S. Pat. publication No. 5,939,846.

BRIEF SUMMARY OF THE INVENTION

In a control method in which the torque ordering is distributed in proportion to the velocities of the left and right wheels to improve the turning performance, there is a problem caused by the below reason.

For example, a condition where one of the wheels runs idle in mud should be considered. In such condition, the velocity of such wheel increases so that the torque ordering distribution for such wheel is increased to accelerate the idle running of such wheel. On the other hand, the torque ordering distribution for the other one of the wheel not in mud is decreased to make a driving force for removing the vehicle out of the mud insufficient so that the vehicle whose one of the wheels is in mud cannot move out of the mud.

An object of the present invention is to enable the driving force of the other one of the wheel to be sufficient for moving the vehicle out of the mud when the one of the wheel runs idle in mud, while improving the turning performance.

According to the invention, during the vehicle turn, the torque ordering for the electric motor for driving the wheel at the radially outer side is made greater than the torque ordering for the electric motor for driving the wheel at the radially inner side to improve the turning performance.

Further, when one of the wheels runs idle in mud, the torque ordering for the electric motor for driving the one of the wheels is decreased to restrain the idle running while the torque ordering for the electric motor for driving the other one of the wheels not running idle is not changed to generate a sufficient driving force for moving the vehicle out of the mud.

Other objects, features and advantages of the invention will become apparent from the following description of the embodiments of the invention taken in conjunction with the accompanying drawings.

BRIEF DESCRIPTION OF THE SEVERAL VIEWS OF THE DRAWINGS

FIG. 16 includes diagrams being different from each other in detected average speed between the left and right electric motors and showing a relationship between the adjusting gain and the detected steering angle for the electrically driven vehicle of the invention.

DETAILED DESCRIPTION OF THE INVENTION

An embodiment of the invention will be described below with making reference to the drawings.

Figure 1:
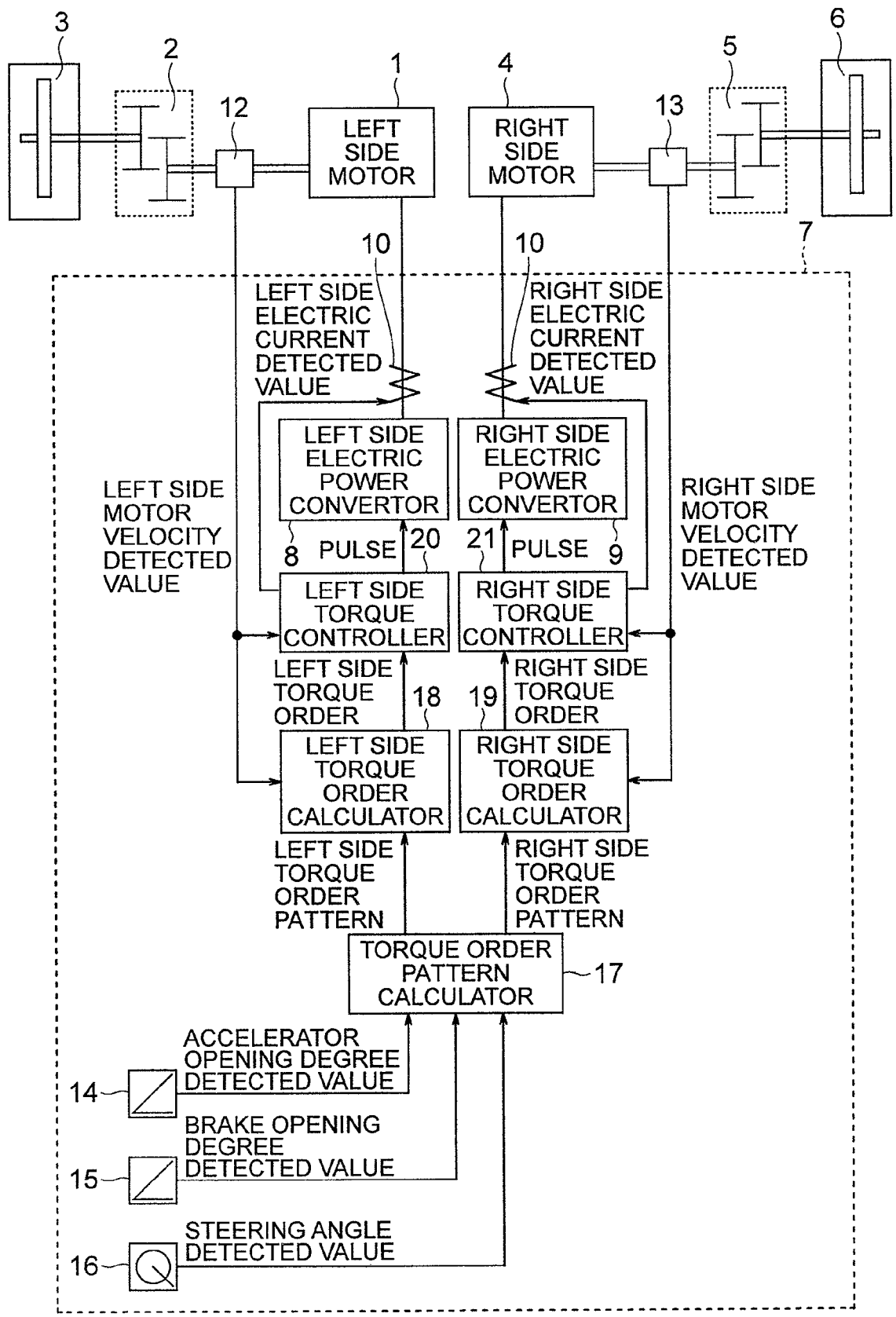
FIG. 1 is a view showing a first embodiment of a controller of the invention for an electrically driven vehicle.

FIG. 1 shows a first embodiment of a controller of the invention. In FIG. 1, a left side electric motor 1 as a first electric motor drives a left side wheel 3 through a left side gear train 2, and a right side electric motor 4 as a first electric motor drives a right side wheel 6 through a left side gear train 5, so that a vehicle proceeds forward and backward. The left side electric motor 1 and the right side electric motor 4 are controlled by an electric motor controller 7, a left side electric power converter 8 drives the left side electric motor 1, and a right side electric power converter 9 drives the right side electric motor 4. A left side electric current detector 10 is connected to the left side electric power converter 8 and the left side electric motor 1 to measure an electric current flowing therebetween. A right side electric current detector 11 is connected to the right side electric power converter 9 and the right side electric motor 4 to measure an electric current flowing therebetween. A left side speed sensor 12 as a first speed sensor is connected to the left side electric motor 1 to measure a rotational speed of the left side electric motor 1. A right side speed sensor 13 as a second speed sensor is connected to the right side electric motor 4 to measure a rotational speed of the right side electric motor 4. Incidentally, the rotational speeds of the left side electric motor 1 and the right side electric motor 4 may be estimated without the left side speed sensor 12 and the right side speed sensor 13.

An accelerator opening degree sensor 14 measures an opening degree of an accelerator pedal operated by a vehicle driver, a brake opening degree sensor 15 measures an opening degree of a brake pedal operated by the vehicle driver, and a steering angle sensor 16 measures an steering angle operated by the vehicle driver.

A torque ordering pattern calculator 17 outputs a left side torque ordering pattern as a first torque ordering pattern and a right side torque ordering pattern as a second torque ordering pattern calculated from the accelerator opening degree measured by the accelerator opening degree sensor 14, the brake opening degree measured by the brake opening degree sensor 15 and the steering angle measured by the steering angle sensor 16.

A left side torque order calculator 18 as a first torque order calculator outputs a left side torque order calculated from the left side torque ordering pattern generated by the torque ordering pattern calculator 17, and the left side rotational speed measured by the left side speed sensor 12. A right side torque order calculator 19 as a second torque order calculator outputs a right side torque order calculated from the right side torque ordering pattern generated by the torque ordering pattern calculator 17, and the right side rotational speed measured by the right side speed sensor 13.

A left side torque controller 20 as a first torque controller outputs to the left side electric power converter 8 as a first electric power converter a gate pulse signal for PWM control calculated from the left side torque order generated by the left side torque order calculator 18, the left side rotational speed measured by the left side speed sensor 12 and the left side electric current measured by the left side electric current detector 10 so that the torque generated by the left side electric motor 1 becomes equal to the left side torque order generated by the left side torque order calculator 18. The left side electric power converter 8 carries out a high-response torque control with high-speed switching of switching element of IGBT or the like based on the received gate pulse signal. A right side torque controller 21 as a second torque controller outputs to the right side electric power converter 9 as a second electric power converter a gate pulse signal for PWM control calculated from the right side torque order generated by the right side torque order calculator 19, the right side rotational speed measured by the right side speed sensor 13 and the right side electric current measured by the right side electric current detector 11 so that the torque generated by the left side electric motor 1 becomes equal to the left side torque order generated by the left side torque order calculator 18. The right side electric power converter 9 carries out a high-response torque control with high-speed switching of switching element of IGBT or the like based on the received gate pulse signal.

Figure 2:
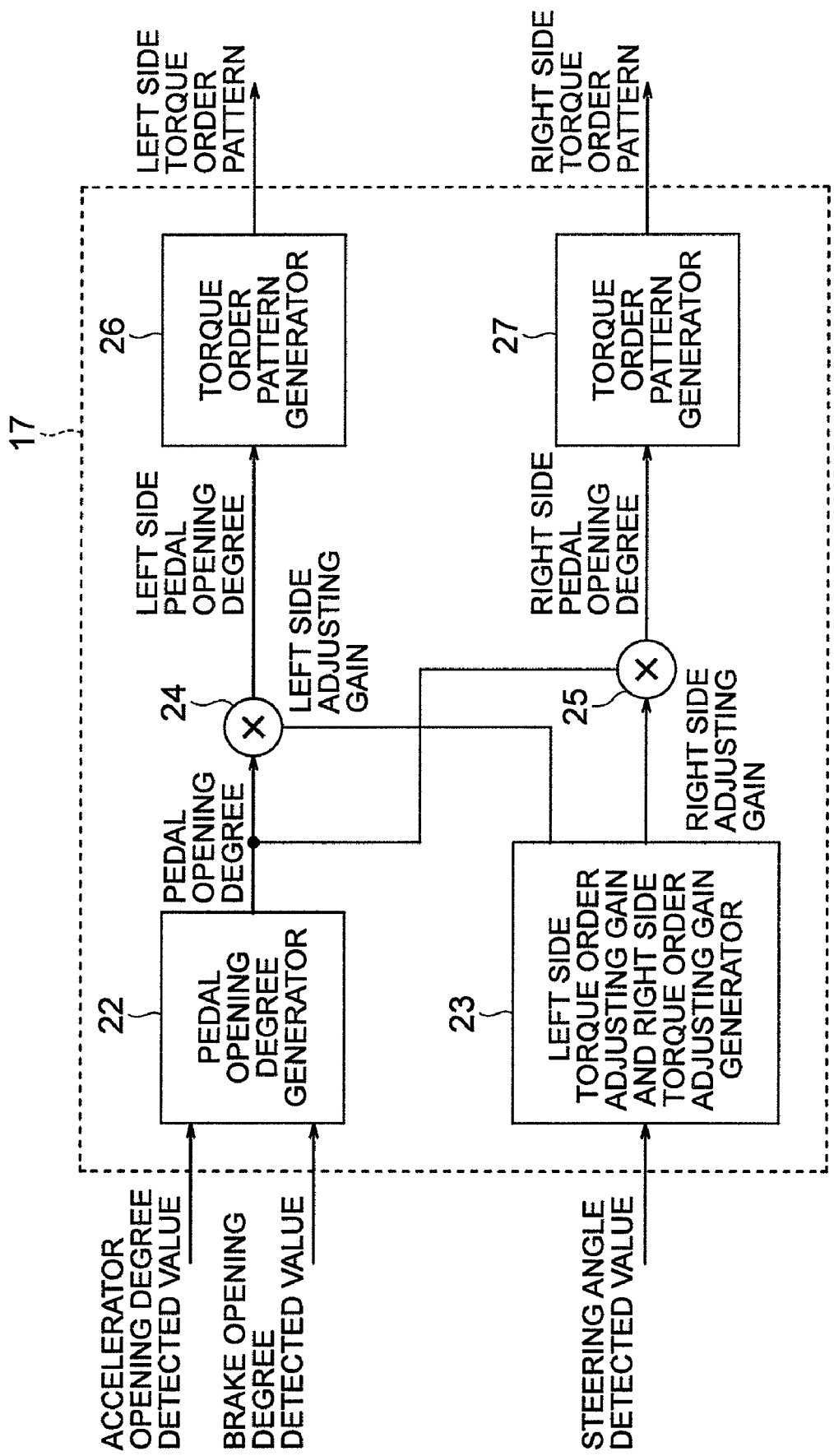
FIG. 2 is a view showing a torque ordering pattern calculator of the invention for the electrically driven vehicle.
Figure 3:
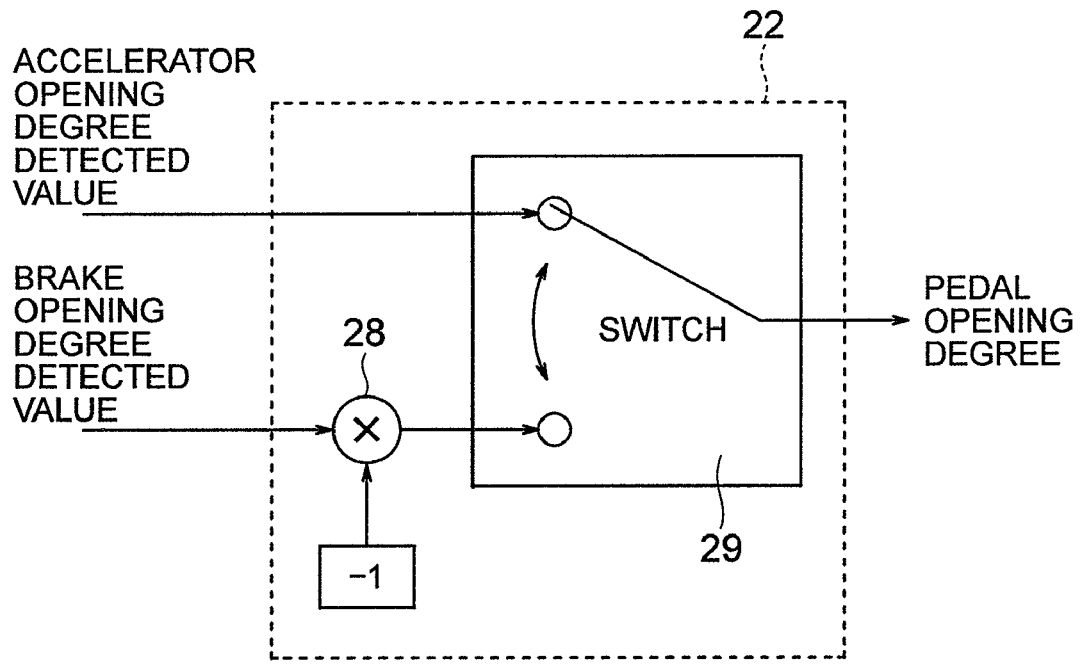
FIG. 3 is a view showing a pedal opening degree generator for the electrically driven vehicle of the invention.

An operation of the torque ordering pattern calculator 17 will be described as follows. FIG. 2 shows a construction of the torque ordering pattern calculator 17. A pedal opening degree generator 22 outputs a pedal opening degree calculated from the measured accelerator opening degree and the measured brake opening degree. FIG. 3 shows a construction of the pedal opening degree generator 22. The pedal opening degree is one of a value of the brake opening degree whose absolute value is not changed but whose sign is inverted between positive and negative by a multiplier 28 and the measured accelerator opening degree selected by a switch 29 which selects the measured accelerator opening degree when the accelerator is operated and selects the value of the brake opening degree when the brake is operated. For example, the pedal opening degree is 50% when the accelerator is operated to output the accelerator opening degree of 50%, and the pedal opening degree is −50% when the brake is operated to output the brake opening degree of 50%. As described above, the pedal opening degree is variable from 100% to −100% to represents the accelerator operation and the brake operation. Incidentally, when both of the brake and accelerator are operated, the value of the brake opening degree whose absolute value is not changed but whose sign is inverted is selected.

A left side torque order adjusting gain and right side torque order adjusting gain generator 23 outputs a left side torque order adjusting gain and a right side torque order adjusting gain. A multiplier 24 outputs a left side pedal opening degree calculated from the pedal opening degree generated by the pedal opening degree generator 22 and the left side torque order adjusting gain generated by the left side torque order adjusting gain and right side torque order adjusting gain generator 23. A multiplier 25 outputs a right side pedal opening degree calculated from the pedal opening degree generated by the pedal opening degree generator 22 and the left side torque order adjusting gain generated by the right side torque order adjusting gain and right side torque order adjusting gain generator 23.

Figure 4:
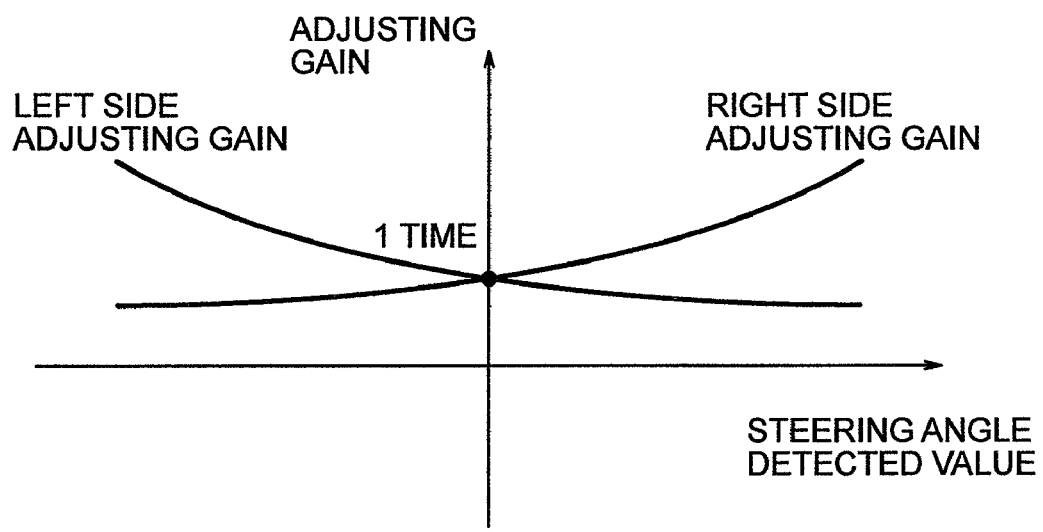
FIG. 4 is a diagram showing a relationship between an adjusting gain and a detected steering angle for the electrically driven vehicle of the invention.

The left side torque order adjusting gain and the right side torque order adjusting gain generated by the left side torque order adjusting gain generated by the right side torque order adjusting gain and right side torque order adjusting gain generator 23 are gains for adjusting torque orders for the left side electric motor 1 and the right side electric motor 4. FIG. 4 shows a relationship between each of the left side torque order adjusting gain and the right side torque order adjusting gain and the measured steering angle. In this case, the steering angle is positive when the vehicle turns to the left. As shown in FIG. 4, the left side torque order adjusting gain and the right side torque order adjusting gain are adjusted in accordance with the measured steering angle. For example, when the detected seering angle is zero to indicate that the vehicle proceeds straightly, the left side adjusting gain and the right side adjusting gain are set at 1 time so that the torque orderings for the left and right electric motors are not modified or adjusted. On the other hand, when the detected steering angle is positive to indicate that the vehicle turns to the left, the left side adjusting gain is made less than 1 time, and the right side adjusting gain is made more than 1 time. On the contrary, when the detected steering angle is negative to indicate that the vehicle turns to the right, the left side adjusting gain is made more than 1 time, and the right side adjusting gain is less more than 1 time.

The torque order pattern generator 26 generates a left side torque order pattern from a left side pedal opening degree output by the multiplier 24. The torque order pattern generator 27 generates a right side torque order pattern from a left side pedal opening degree output by the multiplier 25.

Figure 5:
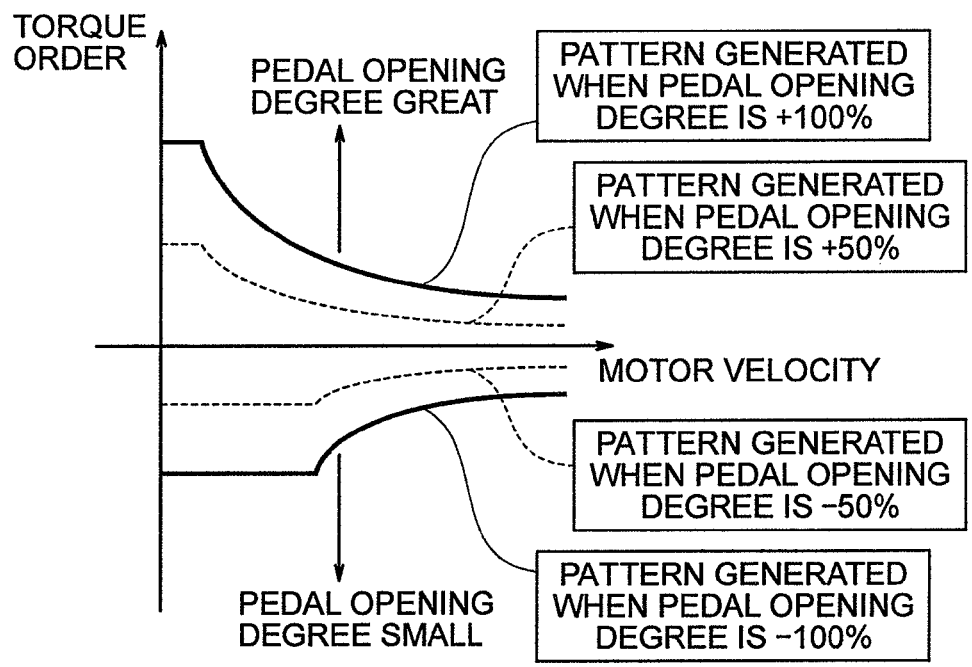
FIG. 5 is a diagram showing a relationship between an ordered torque pattern and the pedal opening degree in the electrically driven vehicle of the invention.

The torque order patterns generated by the torque order pattern generators 26 and 27 are described. FIG. 5 shows examples of the torque order patterns generated by the torque order pattern generators 26 and 27. The torque order pattern generators 26 and 27 include a torque order pattern as a relationship between a rotational velocity of the electric motor and the ordered (desired) torque to be used when the pedal opening degree is 100% and a torque order pattern as a relationship between the rotational velocity of the electric motor and the ordered (desired) torque to be used when the pedal opening degree is −100%, so that the torque order pattern is generated to be in proportion to the input pedal opening degree along the torque order pattern as the relationship between the rotational velocity of the electric motor and the ordered (desired) torque to be used for the pedal opening degree of 100% when the input pedal opening degree is zero or positive as sign thereof, and the torque order pattern is generated to be in proportion to the input pedal opening degree along the torque order pattern as the relationship between the rotational velocity of the electric motor and the ordered (desired) torque to be used for the pedal opening degree of −100% when the input pedal opening degree is negative as sign thereof. For example, as shown in FIG. 5, an absolute value of the torque order for the pedal opening degree of 50% is a half of an absolute value of the torque order for the pedal opening degree of 100%, and an absolute value of the torque order for the pedal opening degree of −50% is a half of an absolute value of the torque order for the pedal opening degree of −100%.

By the above described construction, the torque order pattern calculator 17 outputs the modified torque order patterns as the relationships between the rotational velocity of the electric motor and the ordered (desired) torque for the left side electric motor 1 and the right side electric motor 4 respectively, so that the left side electric motor 1 and the right side electric motor 4 are controlled independently of each other along the modified torque order patterns respectively.

Figure 6:
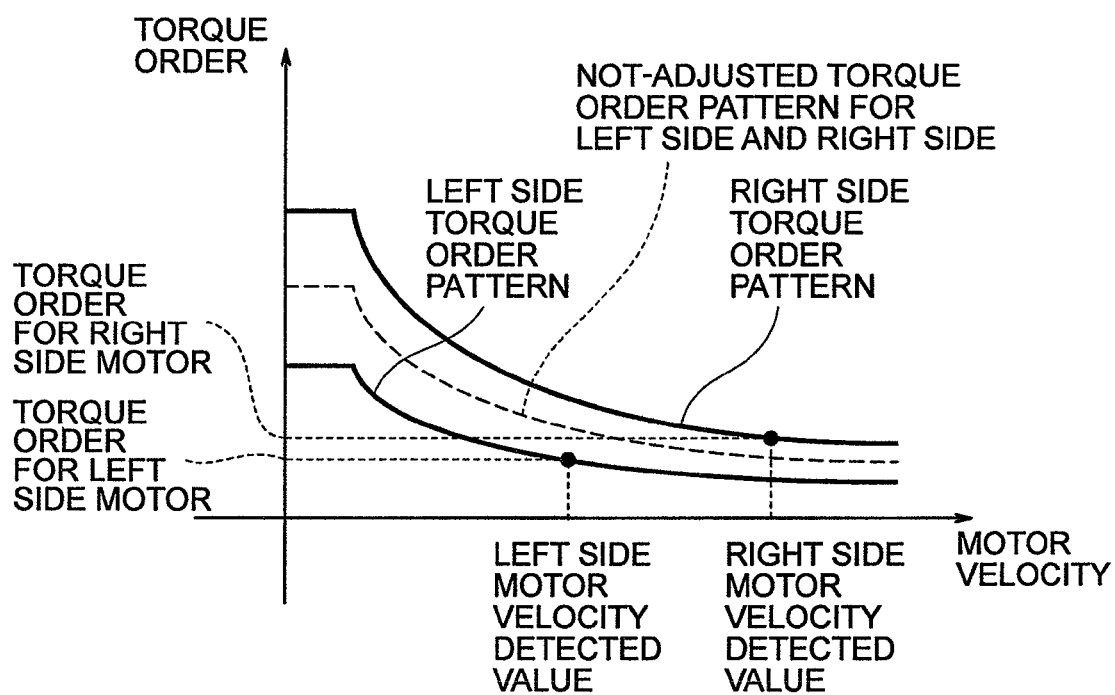
FIG. 6 is a diagram showing a relationship between an electric motor velocity and an ordered torque when an accelerator is operated in the electrically driven vehicle of the invention.
Figure 7:
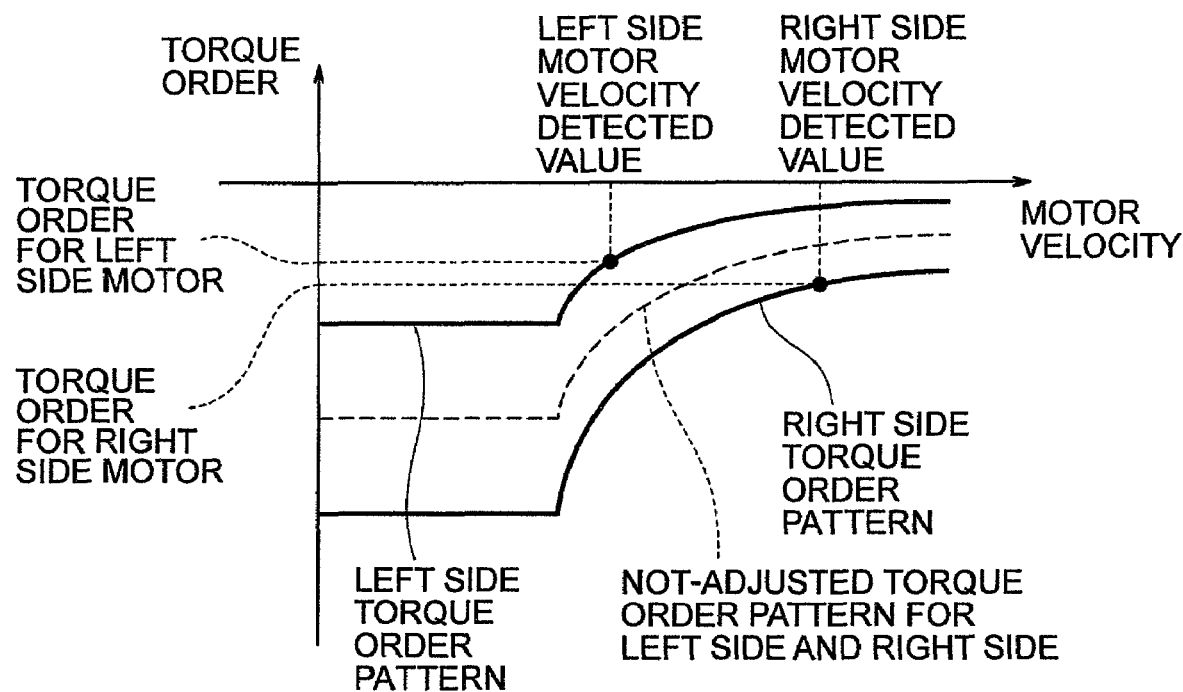
FIG. 7 is a diagram showing a relationship between the electric motor velocity and the ordered torque when a brake is operated in the electrically driven vehicle of the invention.

Examples of the torque order patterns generated by the torque order pattern calculator 17 are shown in FIGS. 6 and 7.

FIG. 6 shows an example to be used when the accelerator is operated while turning to the left. As shown in FIG. 6, the detected velocity of the right side electric motor is made by the turning to the left more than the detected velocity of the left side electric motor. The torque order pattern calculator 17 makes the right side adjusting gain more than 1 time to increase the torque order (desired torque) along the right side torque order pattern and makes the left side adjusting gain less than 1 time to decrease the torque order (desired torque) along the left side torque order pattern so that when the vehicle turns, the torque order for the electric motor at the relatively radially outer side on the turn is increased and the torque order for the electric motor at the relatively radially inner side on the turn is decreased.

FIG. 7 shows an example to be used when the brake is operated while turning to the left. As shown in FIG. 7, the detected velocity of the right side electric motor is made by the turning to the left more than the detected velocity of the left side electric motor. The torque order pattern calculator 17 makes the right side adjusting gain more than 1 time to increase the torque order (desired torque) along the right side torque order pattern and makes the left side adjusting gain less than 1 time to decrease the torque order (desired torque) along the left side torque order pattern so that when the vehicle turns, the torque order for the electric motor at the relatively radially outer side on the turn is increased negatively and the torque order for the electric motor at the relatively radially inner side on the turn is decreased negatively.

By adjusting the torque order patterns for the left side and the right side as described above, when turning, the absolute value of the torque order for the electric motor at the relatively radially outer side is made greater than the absolute value of the torque order for the relatively radially inner side.

Figure 8:
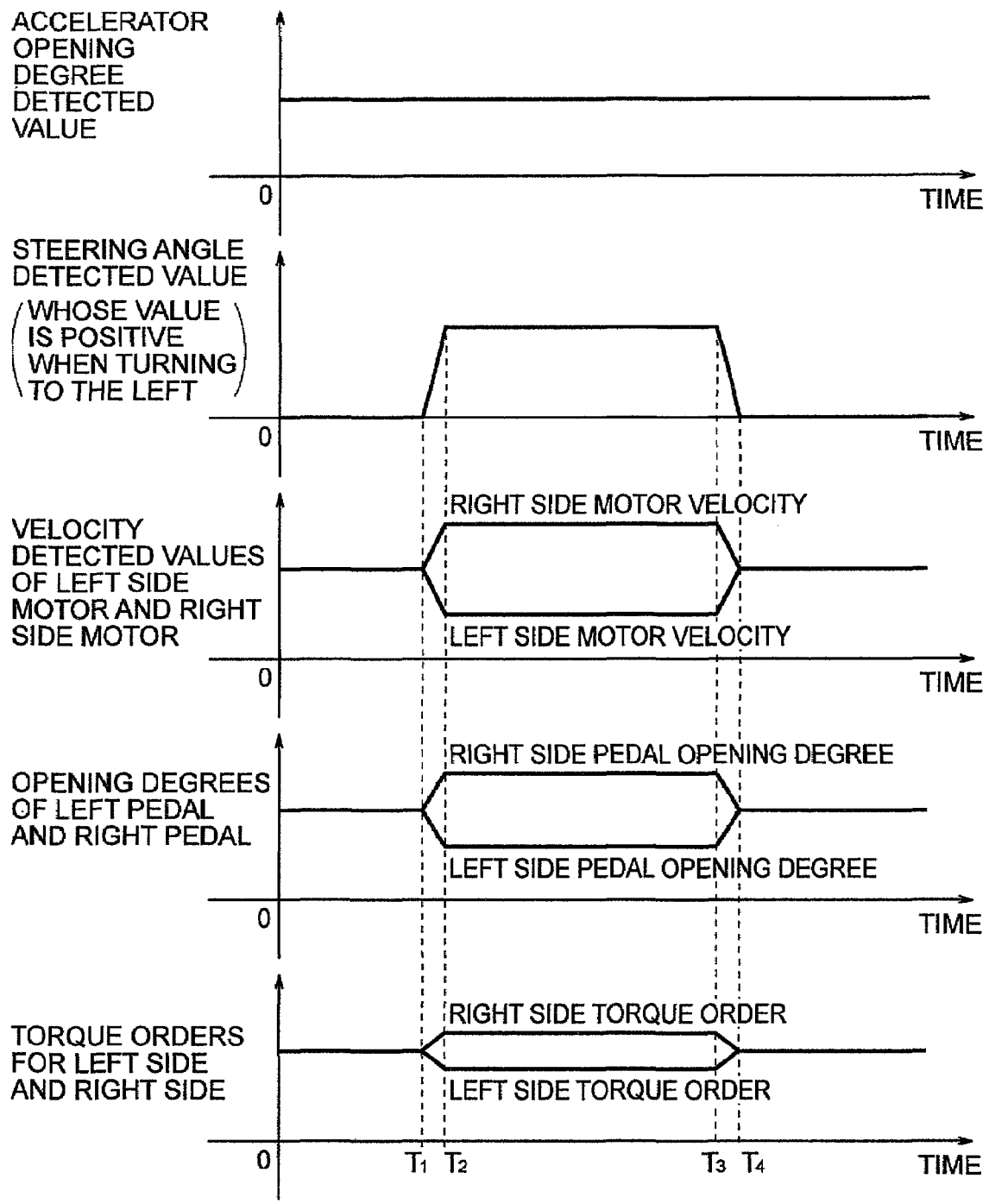
FIG. 8 includes diagrams showing conditions in the electrically driven vehicle of the invention when a steering and the accelerator are operated.
Figure 9:
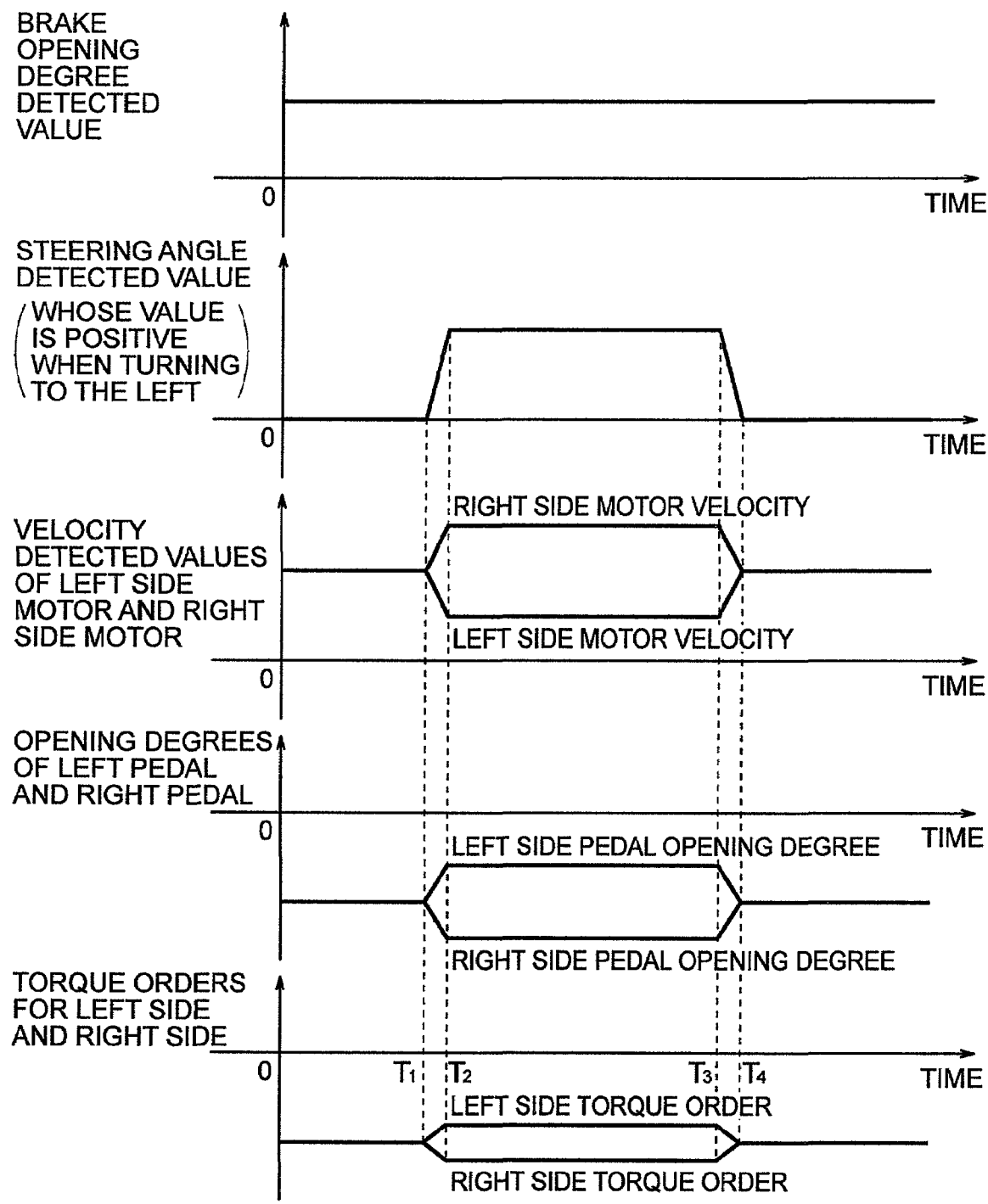
FIG. 9 includes diagrams showing conditions in the electrically driven vehicle of the invention when the steering and the brake are operated.

FIGS. 8 and 9 show examples obtainable when the vehicle proceeds to turn while operating the steering. Incidentally, for simple explanation, a situation for this case is set to keep the vehicle velocity constant.

FIG. 8 shows the examples obtainable when during the operation of the accelerator, the vehicle proceeds straightly, subsequently the steering is operated so that the vehicle turns to the left, the vehicle continues to turn to the left, and finally the steering is operated so that the vehicle proceeds straightly. When the steering is operated in a time period from $T_1$ to $T_2$ to turn to the left side, the vehicle starts to turn to the left to follow the straight proceeding so that the velocity of the right side electric motor increases and the velocity of the left side electric motor decreases. Under such situation, the left side torque order adjusting gain and right side torque order adjusting gain generator 23 starts to modify the gains on the basis of the detected steering angle to make the right side pedal opening degree more than the left side pedal opening degree. Therefore, in the time period from $T_1$ to $T_2$, the right torque order becomes more than the left side torque order. Subsequently, when the steering is operated so that the vehicle proceeds straightly in a time period from $T_3$ to $T_4$, the vehicle starts to proceeds straight to follow the turning to the left so that the velocity of the right side electric motor decreases and the velocity of the left side electric motor increases. Under such situation, the left side torque order adjusting gain and right side torque order adjusting gain generator 23 starts to modify the gains on the basis of the detected steering angle to make the right side pedal opening degree identical to the left side pedal opening degree. Therefore, in the time period from $T_3$ to $T_4$, the right side torque order becomes identical to the left side pedal torque order.

FIG. 9 shows the examples obtainable when during the operation of the brake, the vehicle proceeds straightly, subsequently the steering is operated so that the vehicle turns to the left, the vehicle continues to turn to the left, and finally the steering is operated so that the vehicle proceeds straightly. When the steering is operated in a time period from $T_1$ to $T_2$ to turn to the left side, the vehicle starts to turn to the left to follow the straight proceeding so that the velocity of the right side electric motor increases and the velocity of the left side electric motor decreases. Under such situation, the left side torque order adjusting gain and right side torque order adjusting gain generator 23 starts to modify the gains on the basis of the detected steering angle to make the right side pedal opening degree negatively more than the left side pedal opening degree. Therefore, in the time period from $T_1$ to $T_2$, the right torque order becomes negatively more than the left side torque order. Subsequently, when the steering is operated so that the vehicle proceeds straightly in a time period from $T_3$ to $T_4$, the vehicle starts to proceeds straight to follow the turning to the left so that the velocity of the right side electric motor decreases and the velocity of the left side electric motor increases. Under such situation, the left side torque order adjusting gain and right side torque order adjusting gain generator 23 starts to modify the gains on the basis of the detected steering angle to make the right side pedal opening degree identical to the left side pedal opening degree. Therefore, in the time period from $T_3$ to $T_4$, the right side torque order becomes identical to the left side pedal torque order.

As described above, during the turn of the vehicle, the right torque order can be made more than the left side torque order to improve a turning performance of the vehicle.

Next, a case where in the vehicle of the invention, one of the wheels is in mud to rotate freely is considered. In the prior art method, since the torque order is distributed in proportion to the velocities of the left and right wheels, the velocity of the wheel rotatable freely further increases to increase further a distribution rate of the torque order so that the free rotation of the wheel is further accelerated. On the other hand, according to the invention, although the velocity of the freely rotatable wheel increases, as shown in FIG. 6, the torque order pattern has a characteristic for decreasing the torque order in accordance with the increase in velocity of the electric motor to restrain the wheel from rotating freely.

Further, in the prior art, the free rotation of the wheel causes the decrease of the torque order applied to the not-freely-rotatable wheel. Therefore, the not-freely-rotatable wheel cannot generate the sufficient driving force for removing the vehicle from the mud. On the other hand, according to the invention, since the torque order patterns for the respective left and right electric motors are independent of each other as shown in FIG. 6, the free rotation of the wheel in the mud does not affect the torque of the not-freely-rotatable wheel. In other words, since the not-freely-rotatable wheel is not affected by the freely rotatable wheel, the not-freely-rotatable wheel can generate the driving force for removing the vehicle from the mud.

As described above, according to the invention, while improving the turning performance, the free rotation of the wheel in the mud is restrained, and the not-freely-rotatable wheel can generate the driving force for removing the vehicle from the mud.

Figure 10:
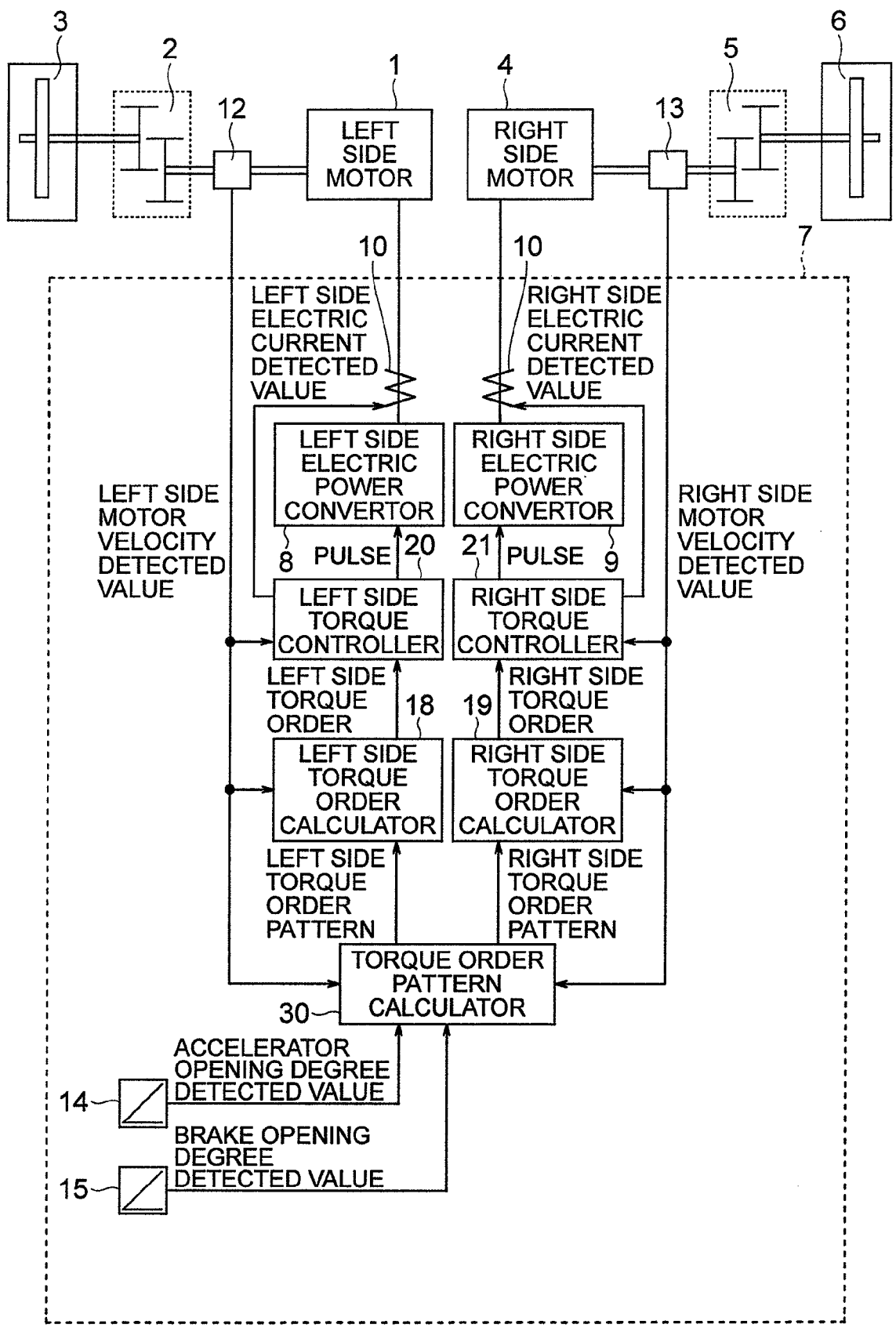
FIG. 10 is a view showing a second embodiment of the controller of the invention for the electrically driven vehicle.
Figure 11:
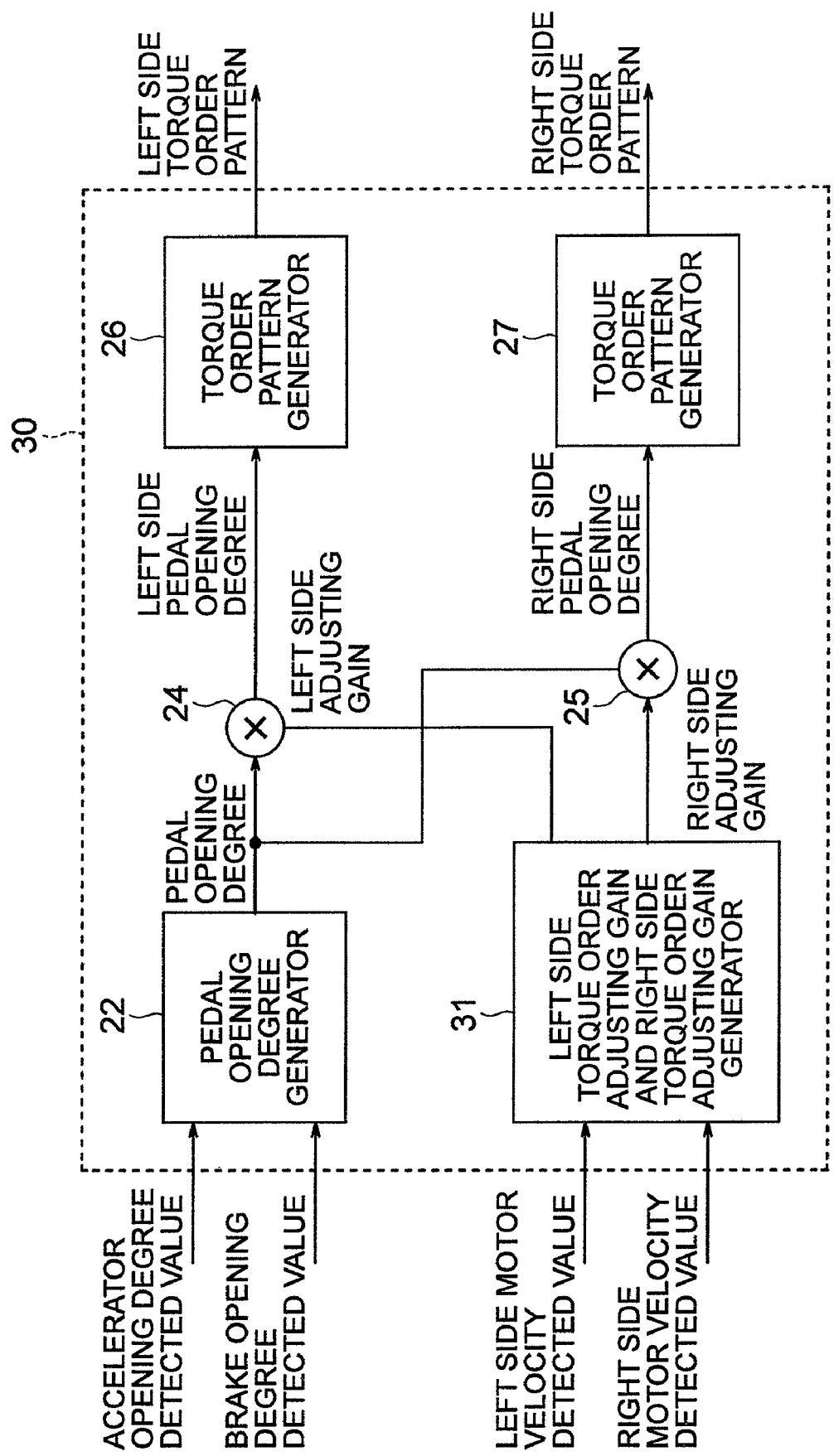
FIG. 11 is a view showing another torque ordering pattern calculator of the invention for the electrically driven vehicle.
Figure 12:
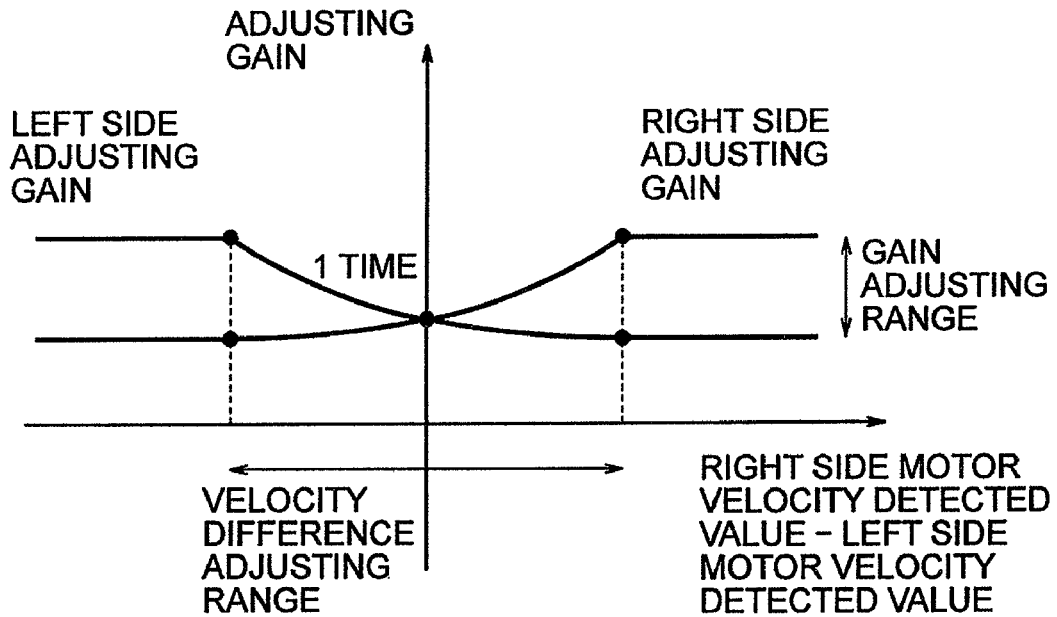
FIG. 12 is a diagram showing a relationship between the adjusting gain and a difference in velocity between left and right electric motors for the electrically driven vehicle of the invention.

FIG. 10 is a second embodiment of the controller of the invention. This is different from FIG. 1 in the torque order pattern calculator 30 in which the detected velocity of the left side motor and the detected velocity of the right side motor as substitute for the detected steering angle are input. FIG. 11 shows a construction of the torque order pattern calculator 30. A left side torque order adjusting gain and right side torque order adjusting gain generator 31 receives the detected velocity of the left side motor and the detected velocity of the right side motor to output the left side adjusting gain and the right side adjusting gain. FIG. 12 shows a relationship among the left side adjusting gain, the right side adjusting gain, the detected velocity of the left side motor and the detected velocity of the right side motor. As shown in FIG. 12, each of the left side adjusting gain and the right side adjusting gain is determined in accordance with a difference in velocity between the left side motor and the right side motor. For example, when the difference in velocity between the left side motor and the right side motor is zero to indicate that the vehicle proceeds straightly, the left side adjusting gain and the right side adjusting gain are made zero to prevent the torque orders for the left side motor and the right side motor from being adjusted. On the other hand, when the velocity of the right side motor is greater than the velocity of the left side motor to indicate that the vehicle turns to the left, the left side adjusting gain is made less than 1 time and the right side adjusting gain is made more than 1 time. On the contrary, when the velocity of the left side motor is greater than the velocity of the right side motor to indicate that the vehicle turns to the right, the left side adjusting gain is made more than 1 time and the right side adjusting gain is made less than 1 time. Incidentally, under this situation, since the adjusting gain for the electric motor for driving the freely rotatable wheel is increased to increase the torque order therefore so that the free rotation thereof is accelerated similarly to the prior art, adjustable ranges for the left side adjusting gain and the right side adjusting gain are limited respectively as shown in FIG. 12. In other words, the left side adjusting gain and the right side adjusting gain are adjustable in accordance with the difference in velocity between the left side motor and the right side motor within the predetermined adjustable ranges, but are prevented from being further adjusted in a range other than the predetermined adjustable ranges. Therefore, the adjusting gain for the electric motor driving the freely rotatable wheel is increased within the predetermined adjustable range, but is limited within the predetermined adjustable range so that the torque order for the electric motor driving the freely rotatable wheel is prevented from further increasing. Further, when the velocity of the freely rotatable wheel is increased further, the torque order is decreased in accordance with the increase of the velocity of the electric motor along the torque order pattern as shown in FIG. 6 to restrain the free rotation. Further, the adjusting gain for the electric motor driving the not-freely-rotatable wheel decreases within the gain adjustable range to prevent the driving force for driving the not-freely-rotatable wheel from being decreased significantly, so that the vehicle can be removed from the mud.

Figure 13:
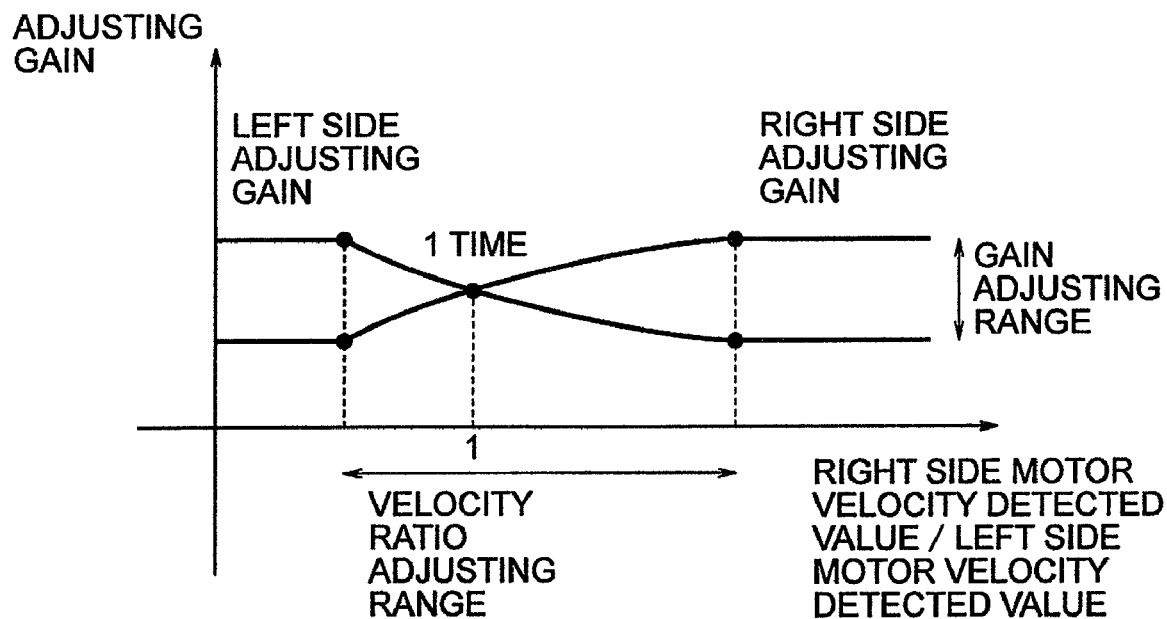
FIG. 13 is a diagram showing a relationship between the adjusting gain and a ratio in velocity between the left and right electric motors for the electrically driven vehicle of the invention.

Further, FIG. 13 shows another relationship among the left side adjusting gain, the right side adjusting gain, the detected velocity of the left side motor and the detected velocity of the right side motor. In FIG. 13, when a ratio in velocity between the left side electric motor and the right side electric motor is within a predetermined range, the left side adjusting gain and the right side adjusting gain are adjusted in accordance with the ratio in velocity between the left side electric motor and the right side electric motor, but are prevented from being further adjusted in a range other than the predetermined range. The effect by the relationship for adjusting the left side adjusting gain and the right side adjusting gain as shown in FIG. 13 and that as shown in FIG. 12 are equivalent to each other.

Figure 14:
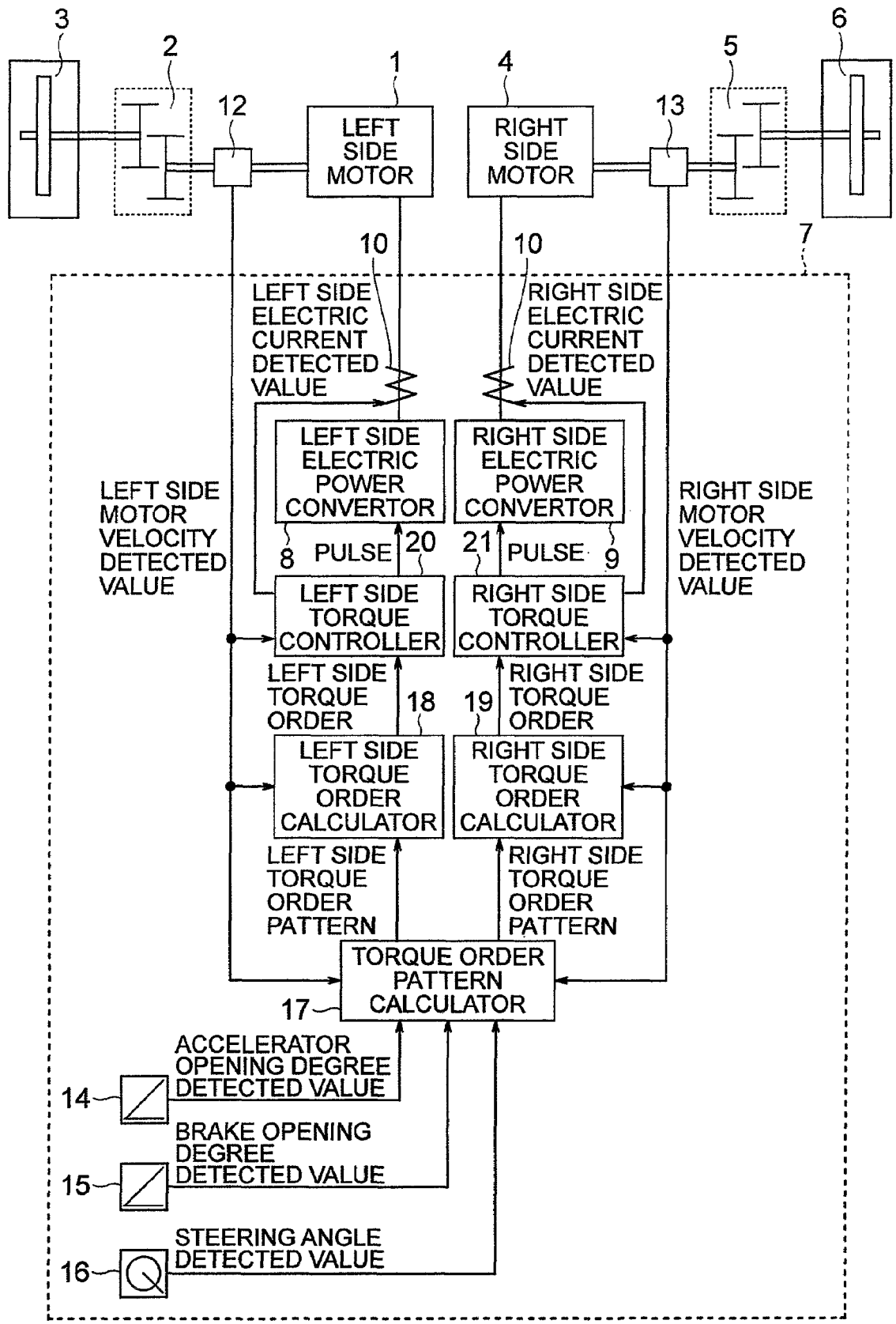
FIG. 14 is a view showing a third embodiment of the controller of the invention for the electrically driven vehicle.
Figure 15:
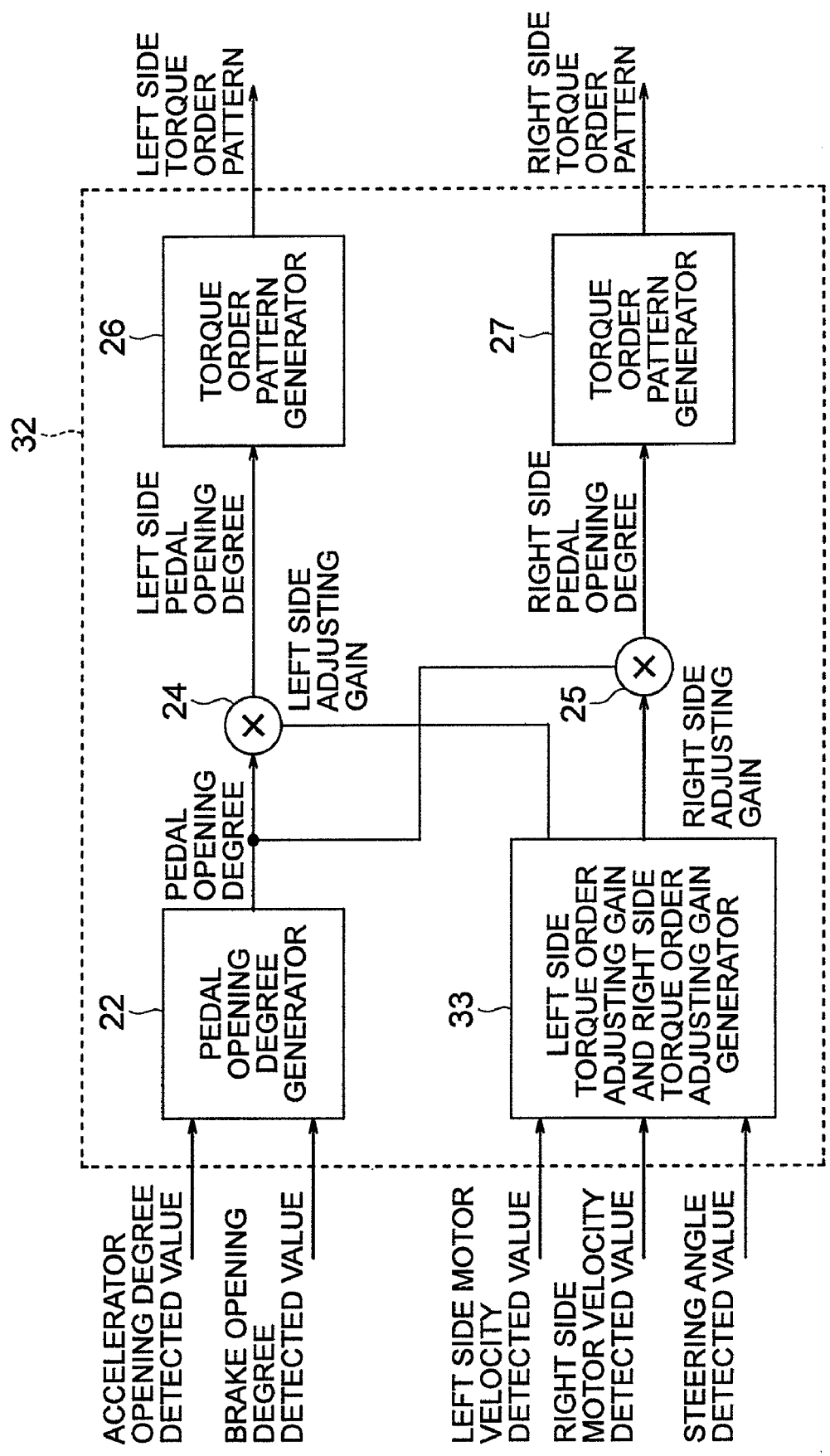
FIG. 15 is a view showing the other torque ordering pattern calculator of the invention for the electrically driven vehicle.

FIG. 14 is a third embodiment of the controller of the invention. This is different from FIG. 1 in the torque order pattern calculator 32 in which the detected velocity of the left side motor and the detected velocity of the right side motor are input additionally. FIG. 15 shows a construction of the torque order pattern calculator 32. A left side torque order adjusting gain and right side torque order adjusting gain generator 33 receives the detected velocity of the left side motor, the detected velocity of the right side motor and the detected steering angle to output the left side adjusting gain and the right side adjusting gain. FIG. 16 shows a relationship among the left side adjusting gain, the right side adjusting gain, the detected velocity of the left side motor, the detected velocity of the right side motor and the detected steering angle. As shown in FIG. 16, each of the left side adjusting gain and the right side adjusting gain is determined basically in accordance with the detected steering angle as shown in FIG. 4, and further modified in accordance with an average velocity between the detected velocity of the left side motor and the detected velocity of the right side motor. When the average velocity between the detected velocity of the left side motor and the detected velocity of the right side motor is great, the left side adjusting gain and the right side adjusting gain change at a small rate with respect to a change of the detected steering angle, and when the average velocity between the detected velocity of the left side motor and the detected velocity of the right side motor is small, the left side adjusting gain and the right side adjusting gain change at a great rate with respect to the change of the detected steering angle. This characteristic is caused by that along the torque order pattern as shown in FIG. 6, the torque order changes greatly in accordance with the change of the velocity of the electric motor when the velocity of the electric motor is low while the torque order changes small in accordance with the change of the velocity of the electric motor when the velocity of the electric motor is high so that the torque order for the electric motor at the radially outer side is significantly small in comparison with the torque order for the electric motor at the radially inner side when the vehicle proceeds to turn at the low velocity of the electric motor while the torque order for the electric motor at the radially outer side is not significantly small in comparison with the torque order for the electric motor at the radially inner side when the vehicle proceeds to turn at the high velocity of the electric motor. Therefore, by adjusting the left side adjusting gain and the right side adjusting gain in accordance with the average velocity between the detected velocity of the left side motor and the detected velocity of the right side motor, the gains are kept for the high turning performance over the whole of the velocity range. Further, the free rotation of the wheel in the mud is restrained, and the not-freely-rotatable wheel can generate the driving force for moving away from the mud similarly to the embodiment of FIG. 1.

Figure 17:
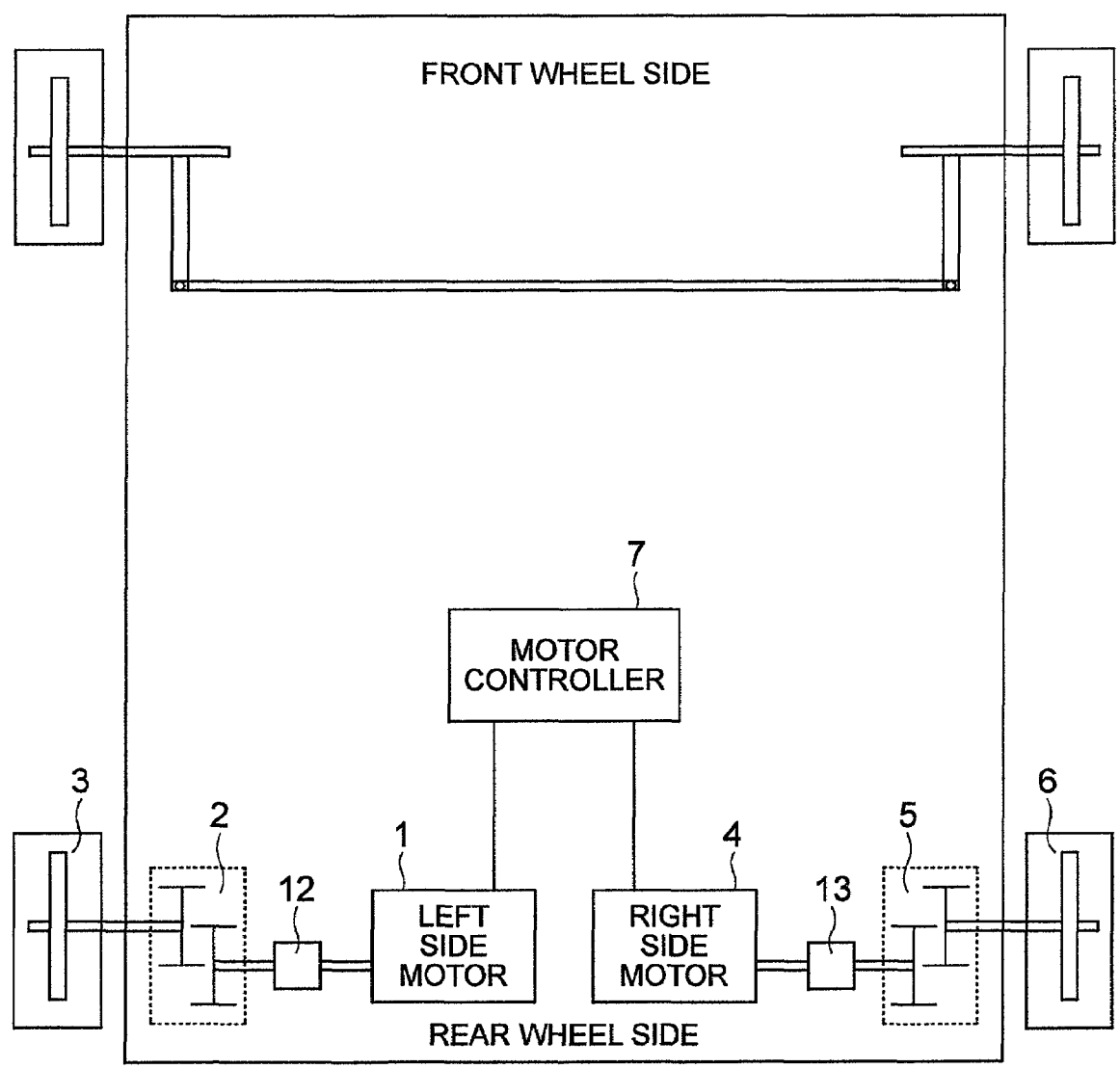
FIG. 17 is a view showing a first embodiment of the electrically driven vehicle of the invention.
Figure 18:
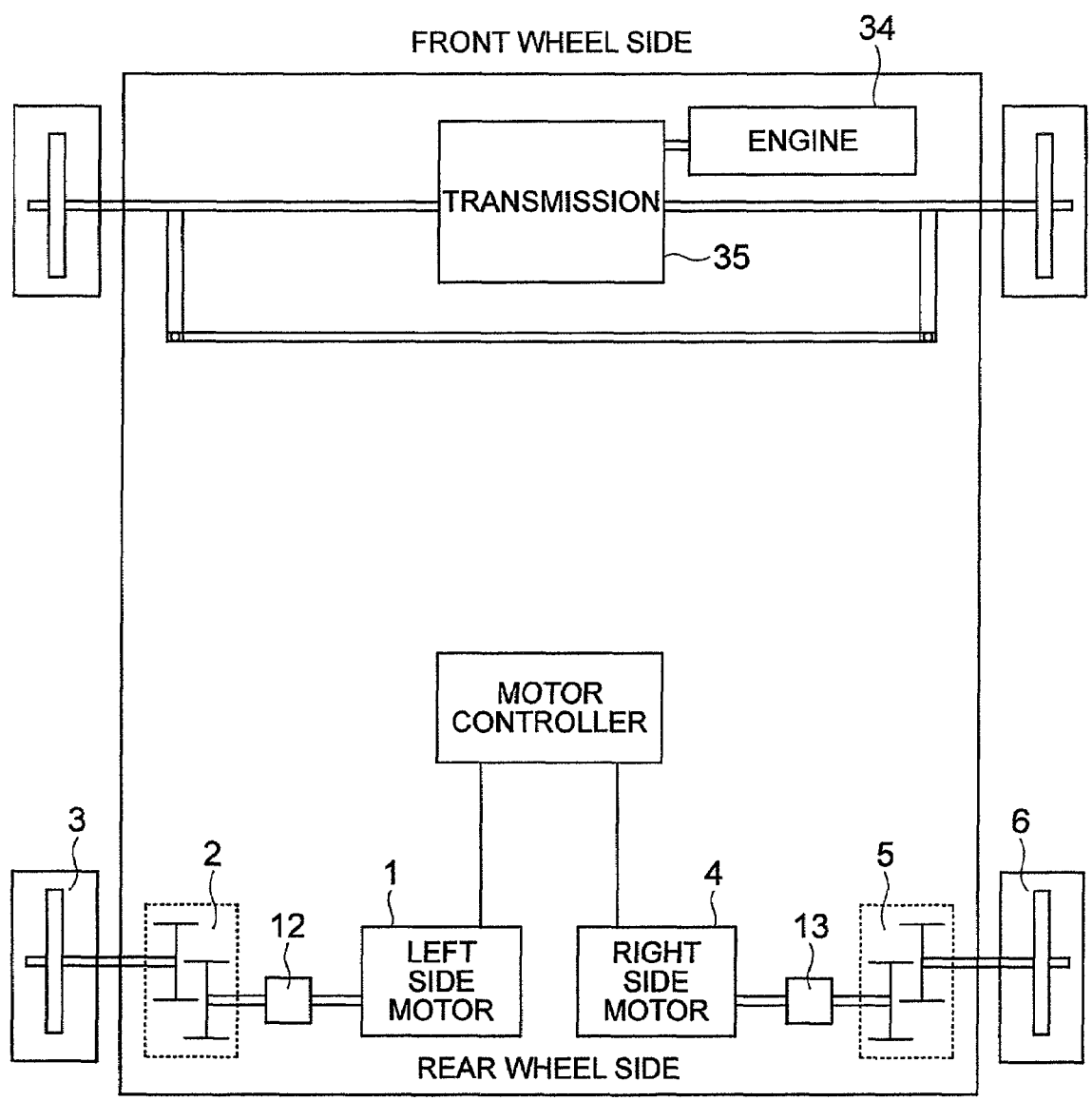
FIG. 18 is a view showing a second embodiment of the electrically driven vehicle of the invention.

FIG. 17 shows a first embodiment of the vehicle of the invention, and FIG. 18 shows a second embodiment of the vehicle of the invention. In FIG. 17, the front wheels are rotated together with the rear wheels, and the rear wheel are driven by the electric motors. The invention applied to the vehicle as shown in FIG. 17 can provide the vehicle in the turning performance is improved and the wheel is restrained from rotating freely in the mud to generate the driving force. Further, contrary to FIG. 17, the front wheel may be driven by the electric motors while the rear wheels are rotated together with the front wheels to have the same effect. Further, the front and rear wheels may be driven by the electric motors to have the same effect.

In FIG. 18, the front wheels are driven by an engine 34 and a transmission 35, and the rear wheels are driven by the electric motors. The vehicle as shown in FIG. 18 can have the same effect. Contrary to FIG. 18, the rear wheels may be driven by an engine 34 and a transmission 35, and the front wheels may be driven by the electric motors to have the same effect.

Incidentally, the torque order pattern in the above embodiment may be map-data defined by parameters of the velocities of the electric motors, the torque orders and so forth, or may be formulas including the parameters.

According to the invention, an electrically driven vehicle by which a turning performance is improved, can be provided.

Further, according to the invention, an electrically driven vehicle by which when one of the wheels rotates freely in the mud, the other one of the wheels can generate the driving force for removing easily the vehicle from the mud.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An electrically driven vehicle comprising,
a first electric motor for driving a left side wheel,
a second electric motor for driving a right side wheel, and
an electric motor controller for controlling the first and second electric motors,
wherein the vehicle further comprises a steering angle sensor for measuring a steering angle of the vehicle to output a detected value of the steering angle,
the electric motor controller includes a first torque order pattern for determining a torque order for the first electric motor and a second torque order pattern for determining a torque order for the second electric motor,
the first torque order pattern and the second torque order pattern are modified in accordance with the detected value of the steering angle so that the torque order determined along the second torque order pattern is greater than the torque order determined along the first torque order pattern under the identical velocity when the vehicle turns to the left, and
the torque order determined along the first torque order pattern is greater than the torque order determined along the second torque order pattern under the identical velocity when the vehicle turns to the right.

2. An electrically driven vehicle comprising,
a first electric motor for driving a left side wheel,
a second electric motor for driving a right side wheel, and
an electric motor controller for controlling the first and second electric motors,
wherein the vehicle further comprises,
a first velocity sensor for measuring a velocity of the first electric motor to output a first detected value of velocity, and
a second velocity sensor for measuring a velocity of the second electric motor to output a second detected value of velocity,
the electric motor controller includes a first torque order pattern for determining a torque order for the first electric motor and a second torque order pattern for determining a torque order for the second electric motor,
the electric motor controller modifies the first torque order pattern and the second torque order pattern in accordance with the first detected value of velocity and the second detected value of velocity when at least one of a difference between the first detected value of velocity and the second detected value of velocity and a ratio therebetween is within a predetermined range so that the torque order determined along the second torque order pattern is greater than the torque order determined along the first torque order pattern under the identical velocity when the vehicle turns to the left, and
the torque order determined along the first torque order pattern is greater than the torque order determined along the second torque order pattern under the identical velocity when the vehicle turns to the right, and when the at least one of the difference between the first detected value of velocity and the second detected value of velocity and the ratio therebetween is at the outside of the predetermined range, the first torque order pattern and the second torque order pattern are prevented from being further modified.

3. An electrically driven vehicle comprising,
a first electric motor for driving a left side wheel,
a second electric motor for driving a right side wheel, and
an electric motor controller for controlling the first and second electric motors,
wherein the vehicle further comprises a steering angle sensor for measuring a steering angle of the vehicle to output a detected value of the steering angle,
a first velocity sensor for measuring a velocity of the first electric motor to output a first detected value of velocity, and
a second velocity sensor for measuring a velocity of the second electric motor to output a second detected value of velocity,
the electric motor controller includes a first torque order pattern for determining a torque order for the first electric motor and a second torque order pattern for determining a torque order for the second electric motor,
the first torque order pattern and the second torque order pattern are modified in accordance with the detected value of the steering angle, the first detected value of velocity and the second detected value of velocity so that the torque order determined along the second torque order pattern is greater than the torque order determined along the first torque order pattern under the identical velocity when the vehicle turns to the left, and the torque order determined along the first torque order pattern is greater than the torque order determined along the second torque order pattern under the identical velocity when the vehicle turns to the right.

4. An electrically driven vehicle comprising, electric motors for at least one of driving and braking left and right wheels respectively, and an electric motor controller for controlling the electric motors, wherein the electric motor controller includes a left side torque order pattern as a function of a velocity of the wheel arranged at a left side of the vehicle and a right side torque order pattern as a function of a velocity of the wheel arranged at a right side of the vehicle, the electric motor for at least one of driving and braking the wheel arranged at the left side of the vehicle is controlled in accordance with a torque order determined along the left side torque order pattern, the electric motor for at least one of driving and braking the wheel arranged at the right side of the vehicle is controlled in accordance with a torque order determined along the right side torque order pattern, the electric motor controller further includes a steering angle sensor for measuring a steering angle of the vehicle, the left side torque order pattern and the right side torque order pattern are modified in accordance with a detected value of the steering angle output by the steering angle sensor so that the torque order determined along the right side torque order pattern is greater than the torque order determined along the left side torque order pattern under the identical velocity when the vehicle turns to the left, and the torque order determined along the left side torque order pattern is greater than the torque order determined along the right side torque order pattern under the identical velocity when the vehicle turns to the right.

5. An electrically driven vehicle comprising, electric motors for at least one of driving and braking left and right wheels respectively, and an electric motor controller for controlling the electric motors, wherein the electric motor controller includes a left side torque order pattern as a function of a velocity of the wheel arranged at a left side of the vehicle and a right side torque order pattern as a function of a velocity of the wheel arranged at a right side of the vehicle, the electric motor for at least one of driving and braking the wheel arranged at the left side of the vehicle is controlled in accordance with a torque order determined along the left side torque order pattern, the electric motor for at least one of driving and braking the wheel arranged at the right side of the vehicle is controlled in accordance with a torque order determined along the right side torque order pattern, the electric motor controller further includes a left side velocity sensor for measuring a velocity of the electric motor for at least one of driving and braking the wheel arranged at the left side of the vehicle and a right side velocity sensor for measuring a velocity of the electric motor for at least one of driving and braking the wheel arranged at the right side of the vehicle, the left side torque order pattern and the right side torque order pattern are modified in accordance with a measured value of the velocity output by the left side velocity sensor and a measured value of the velocity output by the right side velocity sensor when at least one of a difference between the measured value of the velocity output by the left side velocity sensor and the measured value of the velocity output by the right side velocity sensor and a ratio therebetween is within a predetermined range so that the torque order determined along the right side torque order pattern is greater than the torque order determined along the left side torque order pattern under the identical velocity when the vehicle turns to the left, and the torque order determined along the left side torque order pattern is greater than the torque order determined along the right side torque order pattern under the identical velocity when the vehicle turns to the right, and when the at least one of the difference between the measured value of the velocity output by the left side velocity sensor and the measured value of the velocity output by the right side velocity sensor and the ratio therebetween is at the outside of the predetermined range, the left side torque order pattern and the right side torque order pattern are prevented from being further modified.

6. An electrically driven vehicle comprising, electric motors for at least one of driving and braking left and right wheels respectively, and an electric motor controller for controlling the electric motors, wherein the electric motor controller includes a left side torque order pattern as a function of a velocity of the wheel arranged at a left side of the vehicle and a right side torque order pattern as a function of a velocity of the wheel arranged at a right side of the vehicle, the electric motor for at least one of driving and braking the wheel arranged at the left side of the vehicle is controlled in accordance with a torque order determined along the left side torque order pattern, the electric motor for at least one of driving and braking the wheel arranged at the right side of the vehicle is controlled in accordance with a torque order determined along the right side torque order pattern, the electric motor controller further includes a steering angle sensor for measuring a steering angle of the vehicle, a left side velocity sensor for measuring a velocity of the electric motor for at least one of driving and braking the wheel arranged at the left side of the vehicle and a right side velocity sensor for measuring a velocity of the electric motor for at least one of driving and braking the wheel arranged at the right side of the vehicle, the first torque order pattern and the second torque order pattern are modified in accordance with the detected value of the steering angle, the measured value of the velocity output by the left side velocity sensor and the measured value of the velocity output by the right side velocity sensor so that the torque order determined along the right side torque order pattern is greater than the torque order determined along the left side torque order pattern under the identical velocity when the vehicle turns to the left, and the torque order determined along the left side torque order pattern is greater than the torque order determined along the right side torque order pattern under the identical velocity when the vehicle turns to the right.

7. An electrically driven vehicle comprising, a pair of first and second wheels to be arranged at respective sides opposite to each other in a direction perpendicular to a proceeding direction of the vehicle so that when the vehicle turns with a steering angle, one of the first and second wheels is arranged at a relatively radially inner side on the turn of the vehicle and the other one of the first and second wheels is arranged at a relatively radially outer side on the turn of the vehicle, first and second electric motors for generating actual torques for driving rotationally the wheels respectively on respective rotational axes, and a controller for controlling the first and second electric motors, wherein the controller determines desired output torques of the respective first and second electric motors on the basis of required one of acceleration and deceleration of the vehicle, and modifies the desired output torques in accordance with at least one of desired steering angle and actual steering angle so that the desired output torque in absolute value for the one of the first and second wheels is made smaller than the desired output torque in absolute value for the other one of the first and second wheels while a difference in absolute value between the desired output torque for the one of the first and second wheels and the desired output torque for the other one of the first and second wheels increases in accordance with an increase in absolute value of the at least one of desired steering angle and actual steering angle, and the first and second electric motors generate the respective actual torques in accordance with the respective desired output torques modified.

8. The electrically driven vehicle according to claim 7, wherein the controller further modifies the desired output torques in accordance with respective rotational speeds of respective ones of the wheels so that the desired output torques in absolute value decrease in accordance with increases in absolute value of the respective rotational speeds of the respective ones of the wheels.

9. The electrically driven vehicle according to claim 7, wherein the controller modifies at least one of the desired output torques in accordance with an average value between rotational speeds of respective ones of the wheels so that a difference in absolute value between the desired output torques decrease in accordance with an increase in absolute value of the average value.

10. An electrically driven vehicle comprising, a pair of first and second wheels to be arranged at respective sides opposite to each other in a direction perpendicular to a proceeding direction of the vehicle so that when the vehicle turns, one of the first and second wheels is arranged at a relatively radially inner side on the turn of the vehicle and the other one of the first and second wheels is arranged at a relatively radially outer side on the turn of the vehicle, first and second electric motors for generating actual torques for driving rotationally the wheels respectively on respective rotational axes, and a controller for controlling the first and second electric motors, wherein the controller determines desired output torques of the respective first and second electric motors on the basis of required one of acceleration and deceleration of the vehicle, and modifies the desired output torques in accordance with at least one of a speed difference in absolute value between rotational speeds of respective ones of the wheels and a ratio of relatively greater one in absolute value of the rotational speeds of the respective ones of the wheels with respect to relatively smaller one in absolute value thereof so that a torque difference in absolute value between the desired output torque for the one of the first and second wheels and the desired output torque for the other one of the first and second wheels increases in accordance with an increase in absolute value of the at least one of the speed difference and the ratio while the torque difference in absolute value is limited within a predetermined degree, and the first and second electric motors generate the respective actual torques in accordance with the respective desired output torques modified.

11. An electrically driven vehicle comprising, a pair of first and second wheels to be arranged at respective sides opposite to each other in a direction perpendicular to a proceeding direction of the vehicle so that when the vehicle turns, one of the first and second wheels is arranged at a relatively radially inner side on the turn of the vehicle and the other one of the first and second wheels is arranged at a relatively radially outer side on the turn of the vehicle, first and second electric motors for generating actual torques for driving rotationally the wheels respectively on respective rotational axes, and a controller for controlling the first and second electric motors, wherein the controller determines desired output torques of the respective first and second electric motors on the basis of required one of acceleration and deceleration of the vehicle, and modifies the desired output torques in accordance with respective rotational speeds of respective ones of the wheels so that the desired output torques in absolute value decrease in accordance with increases in absolute value of the respective rotational speeds of the respective ones of the wheels, and the first and second electric motors generate the respective actual torques in accordance with the respective desired output torques modified.

12. An electrically driven vehicle comprising, a pair of first and second wheels to be arranged at respective sides opposite to each other in a direction perpendicular to a proceeding direction of the vehicle so that when the vehicle turns, one of the first and second wheels is arranged at a relatively radially inner side on the turn of the vehicle and the other one of the first and second wheels is arranged at a relatively radially outer side on the turn of the vehicle, first and second electric motors for generating actual torques for driving rotationally the wheels respectively on respective rotational axes, and a controller for controlling the first and second electric motors, wherein the controller determines desired output torques of the respective first and second electric motors on the basis of required one of acceleration and deceleration of the vehicle, and modifies at least one of the desired output torques in accordance with an average value between rotational speeds of respective ones of the wheels so that a difference in absolute value between the desired output torques decrease in accordance with an increase in absolute value of the average value, and the first and second electric motors generate the respective actual torques in accordance with the respective desired output torques modified.

* * * * *